United States Patent [19]

Togawa et al.

[11] Patent Number: 4,505,938

[45] Date of Patent: Mar. 19, 1985

[54] PROCESS FOR PRODUCING A SEASONING

[75] Inventors: Hideo Togawa, Enzan; Taihei Takezawa, Otsuki; Masazumi Watanabe, Kashiwa; Kazuya Hayashi, Kashiwa; Akira Okuhara, Kashiwa, all of Japan

[73] Assignees: Kikkoman Corporation, Noda; Mann's Wine Co., Ltd., Tokyo, both of Japan

[21] Appl. No.: 494,613

[22] Filed: May 16, 1983

[30] Foreign Application Priority Data

May 21, 1982 [JP]  Japan .................................. 57-84988

[51] Int. Cl.³ .................. A23L 1/238; A23L 1/23; A23L 1/205
[52] U.S. Cl. ........................................ 426/46; 426/61; 426/589
[58] Field of Search ................ 426/589, 650, 652, 46, 426/61

[56] References Cited

U.S. PATENT DOCUMENTS 3,124,465  3/1964  Watanabe .......................... 426/589
4,241,095  12/1980  Shibata ............................. 426/589

FOREIGN PATENT DOCUMENTS 50-10400  4/1975  Japan ................................. 426/589
29964  3/1978  Japan ................................. 426/589

OTHER PUBLICATIONS

Hanle, Cooking Wild Game, Liveright N.Y. 1974, p. 156.
Lo, Chinese Vegetarian Cooking, Random House N.Y., 1974, p. 41.

Primary Examiner—Jeanette M. Hunter
Attorney, Agent, or Firm—Banner, Birch, McKie & Beckett

[57]  ABSTRACT

A process for producing a soy sauce characterized by adding a matured fruit wine must or a fruit wine to a matured soy sauce moromi mash or raw soy sauce and aging the mixture at room temperature for 3-20 days to expect their mutual interaction.

3 Claims, No Drawings

PROCESS FOR PRODUCING A SEASONING

The present invention relates to a novel process for producing soy sauces.

Soy sauce, the time-honored all-purpose seasoning in Japan, is increasing its variety with the diversification in dietary life. Today, a number of soy sauce-based dressings are also commercialized.

In view of such a trend in soy sauce market, the present inventors conducted various studies with the aim of providing a novel soy sauce. As the result, it was found that a soy sauce having a refreshing feeling and a more preferable taste can be obtained by adding and mixing a matured fruit wine must or a fruit wine into a matured soy sauce moromi mash or a raw soy sauce and then aging the mixture to expect their mutual interaction. Based on this finding, the present invention was accomplished.

It is an object of the present invention to provide a process for producing a soy sauce having a refreshing feeling and a more preferable taste.

Other object and advantages of the present invention will be apparent from the following descriptions.

Soy sauce-based seasonings prepared by adding wine or other seasonings to a soy sauce are well known. However, these seasonings hitherto known are mere mixtures of soy sauce and wine which have been prepared at the final stage of production or just before bottling. Thus, the seasonings thus obtained are no more than a soy sauce-based seasoning from which the original soy sauce flavor has been lost, and their use is quite limited.

On the contrary, according to the present invention, a fruit wine or the like is added to a matured soy sauce moromi mash or a raw soy sauce and then the resulting mixture is subjected to aging for a definite period of time to expect their mutual interaction, so that the soy sauce thus obtained has a refreshing feeling and a more preferable taste while retaining the original soy sauce flavor.

The invention will be explained more concretely below.

The matured soy sauce moromi mash used in the present invention is a soy sauce moromi mash produced by usual process, i.e. by a process which comprises, for example, inoculating a mixture of cooked and denatured defatted soybeans and parched and crushed wheat with Tané-koji (seed starter prepared from a strain belonging to *Aspergillus oryzae* or *Aspergillus sojae*), cultering the mixture at 25°-35° C. for 35-45 hours to obtain a koji, charging the koji into an about equal amount of saline water having a concentration of 20-23% and fermenting and maturing the resulting mixture at 25°-30° C. for 4-6 months. The raw soy sauce used in the present invention is a soy sauce before heating which has been prepared by pressing and filtering the matured soy sauce moromi mash. Any kinds of soy sauces, including koikuchi (dark colored) soy sauce, usukuchi (light colored) soy sauce, a low salt concentration soy sauce and the like, may be used in the present invention.

The matured fruit wine must used in the present invention includes matured musts of wine prepared by the usual process, i.e. by a process which comprises for example, destemming from the fruit of grape, crushing the fruit to obtain a grape juice, inoculating the juice with wine yeast and fermenting it, as well as matured musts of apple wine, fortified wine and the like produced by similar processes. The fruit wine used in the present invention includes fruit wines and fortified wines prepared by clarifying these matured musts.

According to the present invention, a matured fruit wine must or a fruit wine is added to a matured soy sauce moromi mash or a raw soy sauce, and the resulting mixture is aged at room temperature for 3-20 days to expect their mutual interaction. By such a procedure, the soy sauce flavor becomes harmonious with the fruit wine flavor, the addition of fruit wine becomes unnoticeable, and there is obtained a soy sauce having one original soy sauce flavor.

The amount of matured fruit wine or the like to be added is preferably in the range of 3-20%, based on the amount of matured soy sauce moromi mash or the like. By adding it in such an amount, pH value of soy sauce lowers by about 0.05-0.20, and a refreshing feeling is added to the flavor of soy sauce. If the amount of fruit wine or the like is too small, its addition exhibits no effect. If the amount of fruit wine or the like is too large, the original soy sauce flavor is lost. Therefore, the above-mentioned range is preferable.

After the aging, pressing and filtering are carried out if they are necessary, and heating is carried out if it is necessary, whereby the intended product is obtained. Since the addition of fruit wine or the like results in an elevation of alcohol concentration in product which improves its antifungal activity, the procedure of heating becomes almost unnecessary, so far as sodium chloride concentration is in the usual range.

The product thus obtained can be used not only for cooking but also as table condiment as usual soy sauces. Particularly, the product of the present invention is quite excellent in the action of eliminating the unpleasant smell of fish meat and the like.

Hereunder, the effect of the present invention will be illustrated with reference to Experimental Example.

EXPERIMENTAL EXAMPLE

A 50:50 mixture of cooked and denatured defatted soybeans and parched and crushed wheat was inoculated with a seed starter prepared from *Aspergillus sojae* ATCC 42250 and made into a koji with aeration for 42 hours. The resulting koji was charged into an about equal amount of 23% saline water to give a moromi mash. After fermenting and maturing the moromi mash at 25°-30° C. for 6 months with intermittent aeration-agitation, it was subjected to filtration under pressure and sediment separation to obtain a raw soy sauce of which analyses were as shown in Table 1.

TABLE 1

| NaCl | T.N. | R.S. | Alc. | T.A. | pH |
|------|------|------|------|------|-----|
| 17.0% | 1.75% | 3.1% | 3.0% | 1.9 ml | 5.0 |

Note:
T.N. total nitrogen
R.S. reducing sugar
Alc. alcohol
T.A. total acid expressed by consumption of 0.1 N NaOH solution per 1.0 ml of soy sauce In another experiment, Zenkoji grapes variety were subjected to destemming, crushing and pressing in the usual manner to obtain a clear juice. After addition of sugar, it was inoculated with commercial wine yeast (N.J.K.-W 302, manufactured and sold by Nippon Jôzô Kyôkai, Japan) and fermented at 15° C. for 20 days. After allowing it to stand for 5 days for the purpose of maturing, it was subjected to sediment separation and filtered to obtain a white wine of which analyses were as shown in Table 2.

TABLE 2

| R.S. | Alc. | T.A.* | pH |
|---|---|---|---|
| 0.4% | 11.5% | 9.6 g/liter | 3.2 |

*T.A. means a total acid calculated as tartaric acid.

After blending the raw soy sauce of Table 1 with the white wine of Table 2 in the proportion shown in Table 3 and leaving the mixture standing at room temperature for 15 days for the purpose of maturing, it was heated at 80° C. for 30 minutes to obtain a product soy sauce of which analyses were as shown in Table 3. In the control plots (samples Nos. 7-12), heating was carried out immediately after the blending, without carrying out the maturing procedure for 15 days.

TABLE 3

| Sample No. | | Blending ratio Raw soy sauce Wine | NaCl (%) | T.N. (%) | R.S. (%) | Alc. (%) | T.A. (ml) | pH | Organoleptic test 1 | Organoleptic test 2 |
|---|---|---|---|---|---|---|---|---|---|---|
| Test plot | 1 | 100/3 | 16.5 | 1.70 | 3.1 | 3.2 | 1.87 | 4.90 | 12* | 13** |
| | 2 | 100/5 | 16.2 | 1.67 | 3.1 | 3.4 | 1.85 | 4.83 | 14*** | 15*** |
| | 3 | 100/10 | 15.4 | 1.60 | 3.0 | 3.7 | 1.81 | 4.74 | 14*** | 15*** |
| | 4 | 100/15 | 14.8 | 1.52 | 3.0 | 4.0 | 1.77 | 4.71 | 14*** | 15*** |
| | 5 | 100/20 | 14.2 | 1.46 | 2.9 | 4.3 | 1.73 | 4.67 | 13** | 13** |
| | 6 | 100/25 | 13.6 | 1.40 | 2.9 | 4.6 | 1.70 | 4.64 | 10 | 12* |
| Control plot | 7 | 100/3 | 16.5 | 1.71 | 3.1 | 3.3 | 1.86 | 4.90 | | |
| | 8 | 100/5 | 16.2 | 1.67 | 3.1 | 3.3 | 1.85 | 4.85 | | |
| | 9 | 100/10 | 15.3 | 1.61 | 3.1 | 3.7 | 1.82 | 4.75 | | |
| | 10 | 100/15 | 14.8 | 1.53 | 3.0 | 4.1 | 1.78 | 4.71 | | |
| | 11 | 100/20 | 14.2 | 1.45 | 2.9 | 4.2 | 1.73 | 4.69 | | |
| | 12 | 100/25 | 13.5 | 1.40 | 2.9 | 4.7 | 1.70 | 4.65 | | |
| | 13 | 100/0 | 17.1 | 1.74 | 3.1 | 2.9 | 1.80 | 4.95 | | |

Note Organoleptic test 1 was carried out by comparing two samples between test and control plots having the same mixing ratio of wine (for example, sample No. 1 and sample No. 7, or sample No. 2 and sample No. 8) (two point comparison method), and organoleptic test 2 was carried out by comparing each of samples Nos. 1-6 with sample No. 13 (no wine sample) (two point comparison method), both by a panel consisting of 15 persons. The numerical figures express the number of persons who gave better evaluation to samples Nos. 1-6.
*Significant at a level of 5%
**Significant at a level of 1%
***Significant at a level of 0.1%

It is apparent from the results of Table 3 that the products of the present invention prepared by adding white wine to raw soy sauce, maturing the mixture and then heating it (samples Nos. 1-6) are superior to control products prepared by heating the mixture immediately after the addition of white wine (samples Nos. 7-12) from the organoleptic point of view. It is also known that the products of the present invention are superior also to an usual soy sauce containing no white wine (sample No. 13).

Examples of the invention will be shown below. In the analyses mentioned in the examples, T.A. of soy sauce is expressed by consumption of 0.1N NaOH solution per 10 ml of soy sauce, while that of fruit wine is expressed by corresponding quantity of tartaric acid (g/liter).

EXAMPLE 1

A mixture of 60 kg of cooked and denatured defatted soybeans and 80 kg of parched and crushed wheat was inoculated with Tané-koji (seed starter prepared from *Aspergillus sojae* ATCC 42250) and cultured with aeration for 42 hours to obtain koji. Eighty kilograms of this koji was charged into 130 liters of 23% saline water and fermented and matured at 25°-30° C. for 6 months while agitating it by aeration at a frequency of once per 4-7 days, to obtain a matured soy sauce moromi. Analyses of its juice were as shown in Table 4.

TABLE 4

| NaCl | T.N. | R.S. | Alc. | T.A. | pH |
|---|---|---|---|---|---|
| 16.9% | 1.85% | 3.5% | 2.8% | 2.1 ml | 4.9 |

Further, Koshu grapes variety were subjected to destemming, crushing and pressing in the usual manner to obtain a clear juice. After addition of sugar, it was inoculated with wine yeast (*Saccharomyces cerevisiae* OUT 7080) and fermented at 15° C. for 20 days to obtain a wine must. Analyses of fermented must were as shown in Table 5.

TABLE 5

| Alc. | R.S. | T.A. | pH |
|---|---|---|---|
| 11.5% | 0.4% | 5.86 g/liter | 3.3 |

Ten liters of this matured wine must was mixed with 90 liters of the above-mentioned matured soy sauce moromi mash and the mixture was left standing at room temperature for 10 days for the purpose of maturing.

Then, it was subjected to filtration under pressure and sediment separation to obtan a raw soy sauce, which was then accurately filtered by means of a membrane filter to obtain a product shown in Table 6. It was excellent in both flavor and taste.

TABLE 6

| NaCl | T.N. | R.S. | Alc. | T.A. | pH |
|---|---|---|---|---|---|
| 15.2% | 1.67% | 3.15% | 3.6% | 2.02 ml | 4.8 |

EXAMPLE 2

A soy sauce koji was prepared by the same procedure as in Example 1. Eighty kilograms of the resulting koji was charged into 130 liters of 20% saline water, fermented and matured at 25°-30° C. for 6 months with intermittent agitation, and then filtered under pressure to obtain a raw soy sauce shown in Table 7.

TABLE 7

| NaCl | T.N. | R.S. | Alc. | T.A. | pH |
|---|---|---|---|---|---|
| 14.8% | 1.85% | 1.2% | 3.5% | 2.3 ml | 4.8 |

On the other hand, 10 kg of raisin produced in China was extracted with 25 liters of service water to obtain an extract. After adding 9 g of potassium metabisulfite to the extract, pure-cultured yeast N.J.K.-W 302 (manufactured and sold by Nippon Jôzô Kyôkai, Japan) was added, and fermentation was carried out at 15° C. for 20 days. After stopping the fermentation by cooling the mixture at −5° C. for 5 days, it was subjected to sediment separation and filtered to obtain a raw wine shown in Table 8.

TABLE 8

| R.S. | Alc. | T.A. | pH |
|---|---|---|---|
| 0.35% | 11.0% | 5.84 g/liter | 3.3 |

A blended mixture consisting of 50 liters of the raw soy sauce shown in Table 7 and 10 liters of the raw wine shown in Table 8 was left standing at room temperature for 2 weeks for the purpose of maturing. Then, it was heated at 80° C. for 30 minutes to obtain a low salt concentration soy sauce shown in Table 9.

TABLE 9

| NaCl | T.N. | R.S. | Alc. | T.A. | pH |
|---|---|---|---|---|---|
| 12.3% | 1.54% | 1.0% | 4.7% | 2.0 ml | 4.7 |

EXAMPLE 3

Fifty kilograms of apple produced in Nagano Prefecture, Japan, was mashed and pressed in the usual way to obtain an apple juice. After addition of sugar and sulfite to the apple juice, pre-cultured *Saccharomyces cerevisiae* IAM 4274 was added thereto as a starter, and fermentation was carried out at 13° C. for 25 days.

After completion of the fermentation, the mixture was immediately subjected to sediment separation and filtered to obtain an apple wine shown in Table 10.

TABLE 10

| Alc. | R.S. | T.A. | pH |
|---|---|---|---|
| 10.8% | 0.5% | 5.1 g/liter | 3.4 |

Seven liters of this apple wine was mixed with 43 liters of the raw soy sauce obtained in Example 2, and the mixture was left standing at room temperature for 2 weeks for the purpose of maturing, after which it was heated at 80° C. for 30 minutes to obtain a low salt concentration soy sauce shown in Table 11.

TABLE 11

| NaCl | T.N. | Alc. | R.S. | T.A. | pH |
|---|---|---|---|---|---|
| 12.7% | 1.60% | 4.2% | 1.1% | 2.1 ml | 4.8 |

EXAMPLE 4

Cooked and denatured defatted soybeans and parched and crushed wheat were mixed together at a rate of 40:60 (raw material ratio). The mixture was inoculated with a seed starter prepared from *Aspergillus oryzae* ATCC 14895 and cultured with aeration for 42 hours to make a koji. The soy sauce koji thus obtained was charged into saline water and fermented and matured at 15°–20° C. for 3 months. In the course of this fermentation, amazake (sweet drink made from saccharified rice) was added in an amount of 7% based on the weight of soy sauce moromi mash, when 2 months had passed after the charging.

The matured moromi mash of usukuchi (light colored) soy sauce thus obtained was filtered under pressure to obtain a raw usukuchi soy sauce shown in Table 12.

TABLE 12

| NaCl | T.N. | R.S. | Alc. | pH |
|---|---|---|---|---|
| 19.1% | 1.70% | 5.2% | 2.0% | 4.9 |

On the other hand, 100 kg of grape (Koshu variety) was mashed and pressed in the usual way to obtain a clear grape juice. After addition of sugar and sulfite to the grape juice, pre-cultured *Saccharomyces cereviciae* IAM 4274 was added thereto as a starter, and the mixture was fermented at 13° C. for 20 days.

After completion of the fermentation, it was immediately subjected to sediment separation and filtered to obtain a wine. To the wine were added a brandy and malic acid so that alcohol content reached 17% and total acid content reached 7 g/liter. The resulting mixture was dividually poured into small barrels having a capacity of 100 liters and matured in an outdoor storehouse for one year to obtain a fortified wine shown in Table 13.

TABLE 13

| Alc. | R.S. | T.A. | pH |
|---|---|---|---|
| 17.2% | 0.6% | 6.8 g/liter | 3.4 |

Five liters of the above-mentioned fortified wine was added and mixed into 45 liters of raw usukuchi soy sauce shown in Table 12. After leaving the mixture standing at room temperature for 20 days for the sake of maturing, it was filtered by means of a membrane filter having a port size of 0.45 μm to obtain a product soy sauce shown in Table 14.

TABLE 14

| NaCl | T.N. | Alc. | R.S. | T.A. | pH |
|---|---|---|---|---|---|
| 17.2% | 1.53% | 3.4% | 4.6% | 20 ml | 4.8 |

What is claimed is:

1. A process for producing a seasoning which comprises adding a matured fruit wine must or a fruit wine to a matured soy sauce moromi mash or a raw soy sauce in an amount of 3–20% based on the matured soy sauce moromi mash or raw soy sauce, and aging the mixture at room temperature for 3–20 days to expect their mutual interaction.
2. A process for producing a soy sauce according to claim 1, wherein said matured fruit wine must is a matured grape wine must.
3. A process for producing a soy sauce according to claim 1, wherein said fruit wine is a grape wine.

* * * * *